United States Patent
Viertel et al.

[11] Patent Number: 6,019,415
[45] Date of Patent: Feb. 1, 2000

[54] SUN VISOR FOR VEHICLES AND PROCESS FOR MANUFACTURING THE SAME

[76] Inventors: Lothar Viertel, Lilienstrasse 4, D-66802 Altforweiler, Germany; Patrick Welter, Rue Principal 12, F-57730 La Chambre, France

[21] Appl. No.: 08/982,593

[22] Filed: Dec. 2, 1997

[30] Foreign Application Priority Data

Dec. 2, 1996 [DE] Germany .......................... 196 49 801

[51] Int. Cl.⁷ ...................................................... B60J 3/00
[52] U.S. Cl. ............... 296/97.1; 296/97.12; 160/DIG. 3; 29/91.1
[58] Field of Search ................... 296/97.1, 97.9, 296/97.12; 160/DIG. 3; 29/91.1

[56] References Cited

U.S. PATENT DOCUMENTS

| | | | |
|---|---|---|---|
| 5,031,951 | 7/1991 | Binish | 296/97.1 |
| 5,184,867 | 2/1993 | Prillard | 296/97.1 X |
| 5,230,546 | 7/1993 | Smith et al. | 296/97.1 |
| 5,295,725 | 3/1994 | Jones | 296/97.1 |
| 5,678,879 | 10/1997 | Mailander et al. | 296/97.1 |

FOREIGN PATENT DOCUMENTS

| | | | |
|---|---|---|---|
| 1 936364 | 4/1966 | Germany . | |
| 4-176729 | 6/1992 | Japan | 296/97.1 |

OTHER PUBLICATIONS

German Patent Office, Search Report (Jun. 2, 1997) for foreign counterpart application DE 196 49 801.5.

*Primary Examiner*—D. Glenn Dayoan
*Assistant Examiner*—Jason Morrow
*Attorney, Agent, or Firm*—Harness, Dickey & Pierce, P.L.C.

[57] ABSTRACT

What is described is a sun visor for vehicles, having a sun visor body formed of foamed plastic, in particular PU (polyurethane), and at least one bearing body, embedded in the foam material of the sun visor body by foam spray-coating for a sun visor axle, and a STIFFENER for the sun visor body. In such a sun visor, in order to create a sun visor body with high stability and torsional rigidity, the invention provides, as the STIFFENER at least one nonstretchable length of material, which on at least one broad side of the sun visor body extends over the surface and is intimately joined to the plastic material of the sun visor body.

15 Claims, 3 Drawing Sheets

SUN VISOR FOR VEHICLES AND PROCESS FOR MANUFACTURING THE SAME

FIELD OF THE INVENTION

The invention relates to a sun visor for vehicles, having a sun visor body formed of foamed plastic, in particular PU (polyurethane), and at least one bearing body, embedded in the foam material of the sun visor body by foam spray-coating, for a sun visor axle, and a stiffening means for the sun visor body. The invention also relates to a method for producing a sun visor.

BACKGROUND OF THE INVENTION

Sun visors for vehicles are known in the most various embodiments. In one widely used embodiment, the sun visor body comprises PU foam and has a reinforcing inlay placed in it and at least one bearing body for a sun visor axle. A reinforcing inlay typically comprises a wire frame, which is placed in the sun visor body adjacent to the surrounding edge thereof. However, plastic frames or plastic and steel combinations are also used as reinforcing inlays. At least one bearing body, which receives a sun visor axle at one end, is secured to the reinforcing inlay. The other end of the sun visor axle is seated in a bearing block, which can be secured to the vehicle body.

As a rule, the reinforcing inlays for sun visor bodies formed of PU foam comprise a wire frame whose object is to reinforce and stiffen a sun visor body. The conventional reinforcing inlays do not satisfactorily meet this object. Even in relatively small sun visors intended for use in passenger cars, when the sun visor body is folded from the position for use to the nonuse position, and conversely, twisting of the sun visor body occurs, especially whenever the sun visor body is not grasped in the middle. In larger sun visors, which are intended for use in buses or similar large-capacity vehicles and can have lengths of 600 to 1100 mm, the torsional rigidity is weaker still, even though in that case very heavy reinforcing frames of wire with intermediate struts are employed. The instability of the sun visor body also leads to unattractive creasing of a sheathing material that often surrounds the sun visor body and is a constant source of complaints.

From German Utility Model DE-GM 1 936 364, a sun visor with a sun visor body of foamed polyurethane has been disclosed. Arbitrarily spring-elastic, resilient reinforcing and securing devices can be foamed in with the sun visor body. A mechanical, spring-elastic reinforcement of the sun visor body is intended moreover to be made possible by mounting indentations on the outside of it, so that over the course of the foaming process a densification of material and hence increased material strength is to be created. Reinforcing elements may also be inserted afterward into the indentations by means of adhesive bonding, welding or riveting.

OBJECT AND SUMMARY OF THE INVENTION

Accordingly, it is the object of the invention to overcome the disadvantages discussed above of a conventional sun visor, and to create a sun visor with a sun visor body that is intended to be distinguished by high stability and torsional rigidity.

To attain this object, it is provided according to the invention that as the stiffening means, at least one non-stretchable length of material is provided, which on at least one broad side of the sun visor body extends over the surface and is intimately joined to the plastic material of the sun visor body.

By this provision of the invention, it has been possible to attain a surprisingly great improvement in quality, especially with a view to the bending and torsional rigidity of a sun visor body. The invention makes it possible to leave the conventional structure of a sun visor body unchanged, so that major interventions into ongoing mass production of a model do not have to be made. In that case, the usual reinforcing inlay is left in place, and the advantage of the invention is limited to an improvement in quality. As tests have shown, however, at least in sun visors with relatively small dimensions of the kind used in passenger cars, the placement of a reinforcing inlay can be dispensed with entirely, so that along with the advantage of an improvement in quality, the invention also brings the advantage of considerable cost savings. But even in large visors, the invention offers considerable cost advantages, because a reinforcing inlay is dispensed with, or recourse may be had to a leaned-down reinforcing inlay without intermediate hoops, struts and the like. Dispensing with a reinforcing inlay or using a leaned-down reinforcing inlay has the advantage not only of saving costs but also of saving weight, which today is quite important. Tests and calculations have shown that a cost and weight saving of more than 50% each can be attained, for sun visor bodies of the same dimensions. However, it has been found that even in the thickness dimension, potential savings are also involved, because the surprisingly high stability of the sun visor of the invention also allows reducing the thickness of the sun visor bodies.

The advantages of the provision according to the invention with regard to dimensional stability and weight and cost savings are supplemented by still further advantages, among which a particular surface quality of the sun visor bodies can be emphasized first. By dispensing with a reinforcing inlay, or substantial portions of such a reinforcing inlay, the expanded PU foam also develops less turbulence, and thus fewer bubbles can form, which in turn leads to an improved surface quality. The length of material according to the invention offers a further advantage with regard to the use of parting agents, because a parting agent is now required only to a lesser extent, since the PU foam no longer adheres directly to the foaming mold over substantial regions. By dispensing with a reinforcing inlay or substantial parts thereof, it is naturally also possible to dispense with positioning pins in the foaming mold.

The adhesion of the at least one length of material to the sun visor body is advantageously attained in that the at least one length of material is pierced or penetrated at least regionally with plastic material of the sun visor body.

Advantageously, extending over each broad side of the sun visor body is a length of material intimately joined to it. A departure from this provision may be made under some circumstances, whenever an indentation for a mirror unit begins at a broad side of the sun visor body. However, it is readily conceivable to provide a length of material in intimate communication with the plastic material on the bottom of the indentation as well, in order thereby to stabilize what at that location is a relatively thin region of wall.

In accordance with a substantial further refinement of the invention, it is provided that the length of material or each length of material comprises a paper blank. It has already been found to be more than surprising that by means of simple paper blanks a substantial improvement in quality could be attained with regard to strength and torsional rigidity. The first experiments performs were done with outstanding success using commercially available writing paper. It is recommended that a poorly absorbent paper with a weight per unit of surface area of 50 g/m² to 110 g/m², and preferably 80 g/m², be used.

In order to meet the aesthetic expectations of customers, the sun visor body of the invention may have a sheath of plastic films, or blanks of textile material or leather.

The method for producing a sun visor is performed using a two-part foaming mold that has a mold cavity for the sun visor body, wherein at least one bearing body for a sun visor axle is introduced into the mold cavity of the initially open foaming mold and positioned, and a liquid plastic mixture is then introduced, which after the closure of the foaming mold foams up and hardens in the mold cavity. The method of the invention is distinguished in that before the liquid plastic mixture is introduced into the mold cavity, a thin, nonstretchable length of material is applied to at least one mold cavity wall that is intended for forming one broad side of the sun visor body. At least one length of material may be retained on the mold cavity wall by applying adhesive in dots. In accordance with another feature, however, at least one length of material may also be retained on the mold cavity wall by a vacuum applied to the foaming mold. As the length of material, preferably a length of material comprising paper is used; only slightly absorbent paper with a weight per unit of surface area of 50 g/m² to 110 g/m², and preferably 80 g/m², is to be used.

In the foaming of the plastic material fed into the mold cavity, this material at least slightly penetrates the thin length of material, producing the intimate communication between the plastic material and the length of material. Since the length of material is inelastic, it counteracts both a bending stress and any attempt to twist the sun visor body.

In a further feature of the invention, finally, it may also be provided that the sun visor body, after the hardening of the plastic material, is sheathed in an ensuing operation with plastic films, textile material blanks or leather blanks.

Exemplary embodiments of the invention will be described in further detail below in conjunction with the drawings.

DESCRIPTION OF THE PREFERRED EMBODIMENTS

Figure 1:
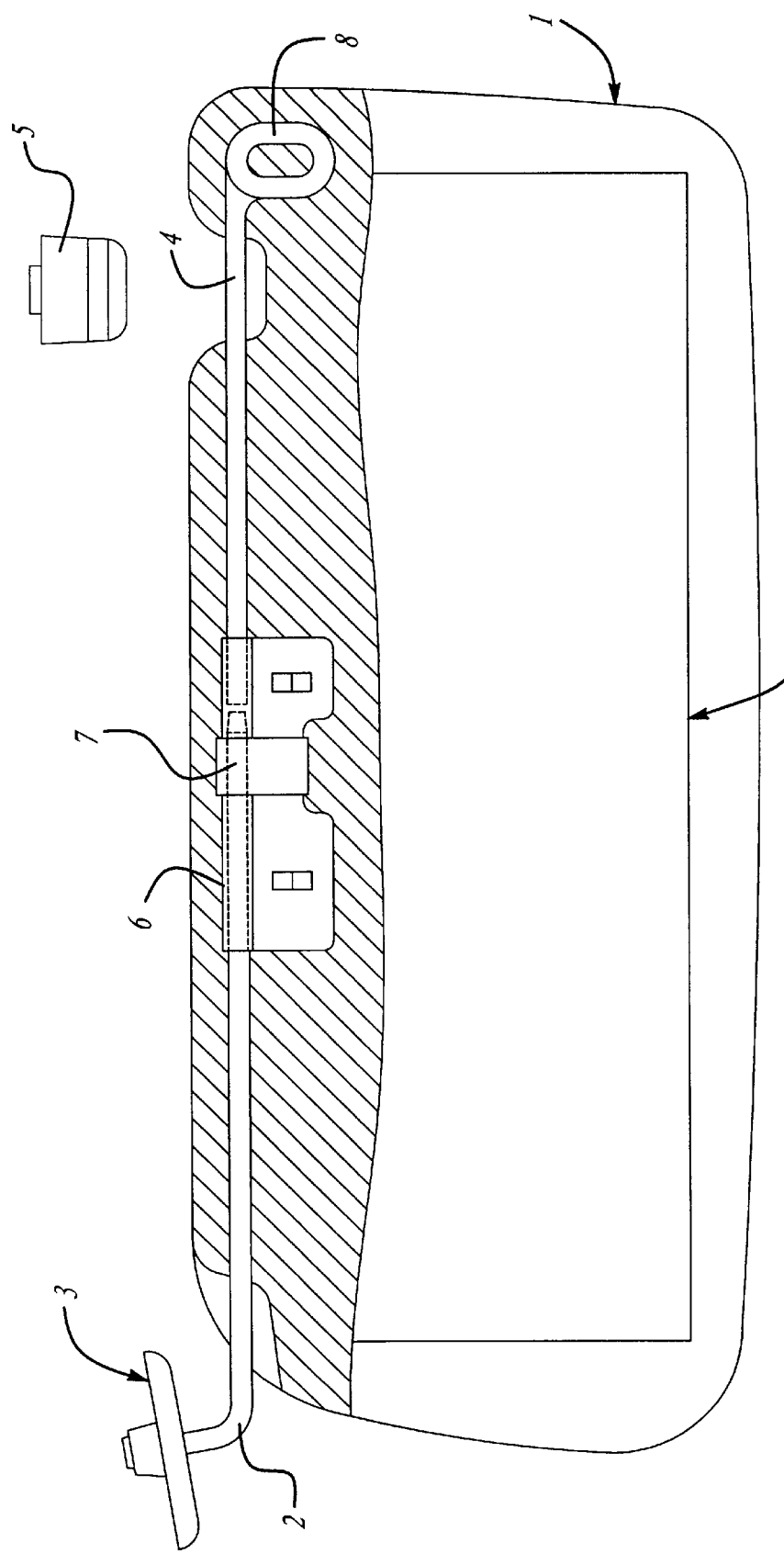
FIG. 1 is a partly cutaway front view of a first sun visor.

The sun visor of FIG. 1 is intended for use in passenger cars and includes a sun visor body 1, a sun visor axle 2 with small main bearing blocks 3, and a counterpart bearing axle 4 with counterpart small bearing blocks 5.

The sun visor body 1 is pivotable about the long segment of the sun visor axle 2, in order to move it from the nonuse position to the position of use and vice versa. The short segment of the sun visor axle 2 is supported rotationally movably in the main small bearing block 3, so that the sun visor body 1 can be pivoted over against a side window of the vehicle. In that case, the counterpart bearing axle 4 is unclipped from the bearing support of the counterpart small bearing block 5. The counterpart bearing axle 4 is rigidly placed in the sun visor body 1, and a formed-on eyelet 8 assures its nonrotatability.

Figure 2:
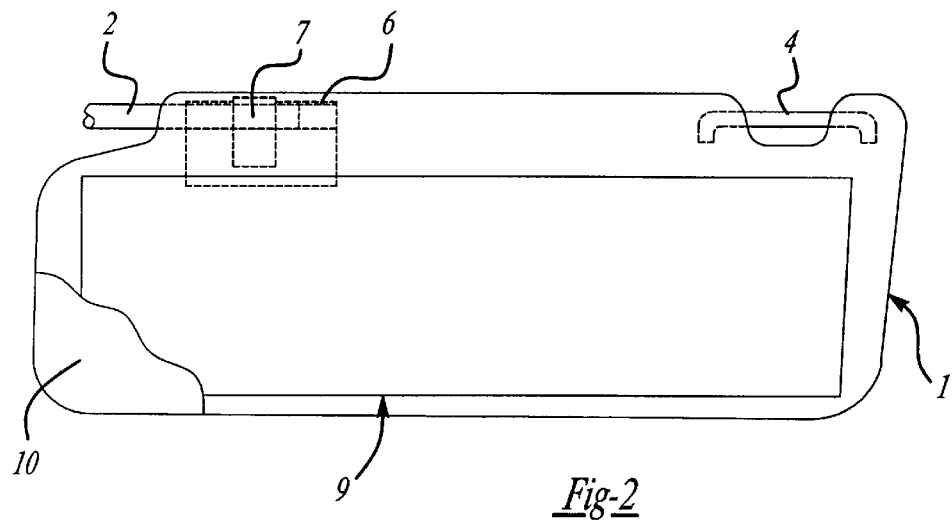
FIG. 2 is a front view of a second sun visor.

The special feature of the sun visor of FIG. 1 is that at least the broad side of the sun visor body 1 facing the observer has a nonstretchable length of material 9 in intimate communication with the material of the sun visor body, which preferably comprises a paper blank. The sun visor body 1 preferably has a length of material 9 extending over the surface of both broad sides. As shown in FIG. 2, the length of material 9 should not be substantially smaller than the broad sides of the sun visor body.

The sun visor shown in FIG. 2 has the same primary components as the sun visor described in conjunction with FIG. 1. Here, the counterpart bearing axle 4 does not extend as far as the bearing body 6, and the bearing body is placed entirely asymmetrically in an end region of the sun visor body 1. The bearing body 6 receives the sun visor axle 2 and the detent spring 7 that clamps the sun visor axle.

In the sun visor of FIG. 2 as well, the special feature is that instead of an otherwise usual wire frame or the like, a reinforcing means is provided, which comprises a nonstretchable length of material 9, which is preferably disposed on each broad side of the sun visor body 1 and extends over the surface thereof and is intimately joined to the plastic material of the sun visor body 1.

FIG. 2 further shows that the sun visor body 1 may have a sheath 10, which in the simplest version comprises plastic films and in a higher-grade version comprises textile material, while in a luxury version it comprises genuine leather.

Figure 3:
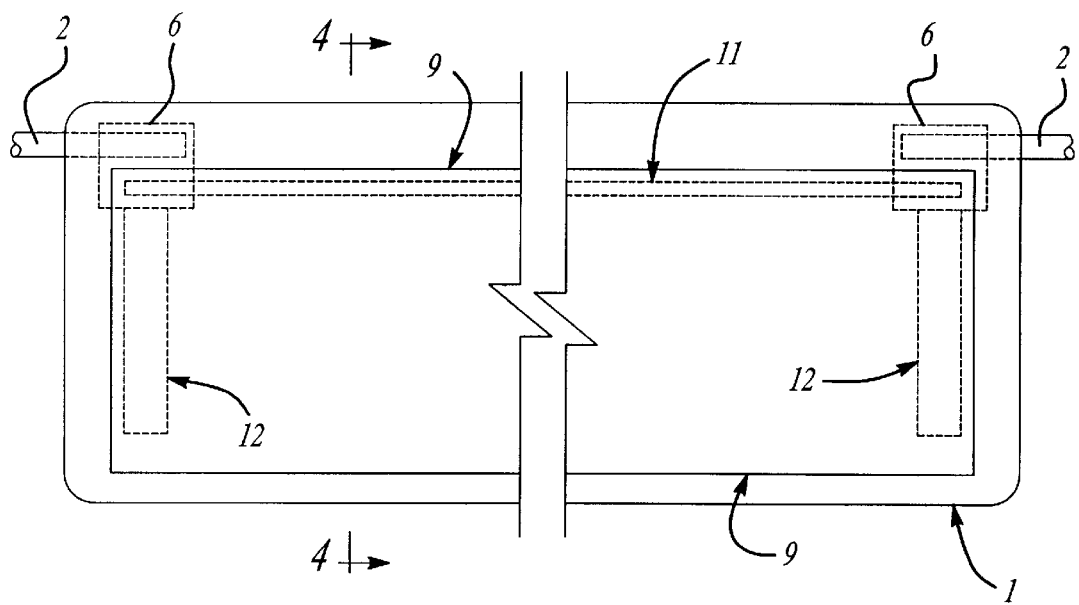
FIG. 3 is a front view of a third sun visor.
Figure 4:
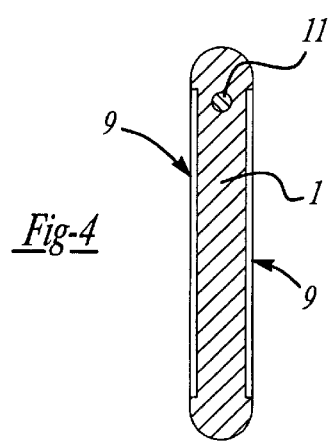
FIG. 4 is a sectional view taken along the line A—A of FIG. 3.

The sun visor of FIGS. 3 and 4 is intended for use in trucks and the like and has a length between about 600 and 1100 mm. The sun visor body 1 of this sun visor has one bearing body 6 in place on both end regions, in each case intended to support sun visor axles 2. Joined to the bearing bodies 6 is a rod 11, which may comprise a piece of wire. Reinforcing struts 12, which are foamed in place in the sun visor body material, extend from each bearing body 6, oriented toward the lower longitudinal edge of the sun visor body 1.

Once again, however, lengths of material 9 preferably comprising paper and intimately joined on the surface to the broad sides of the sun visor body 1 serve as the essential reinforcing means for the sun visor body 1.

It has been found that both nonimpregnated and impregnated paper, such as transparent paper, may be used, but also inelastic foils and films. However, the best experimental results so far have been obtained with commercially available writing paper.

Figure 5:
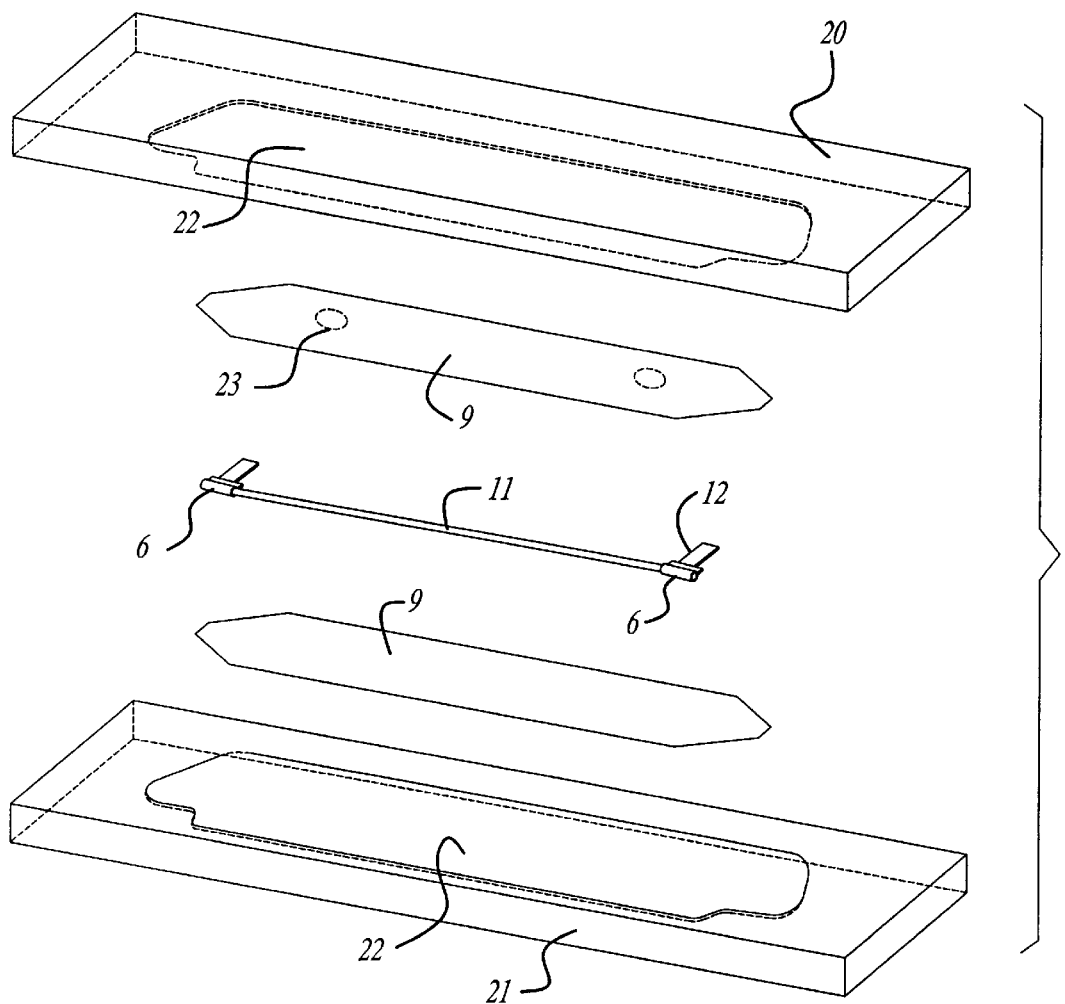
FIG. 5 shows a foaming tool for producing a sun visor of FIG. 3.

FIG. 5, in a simplified illustration, shows a foaming tool for producing a sun visor body. The foaming tool includes one upper and one lower tool half 20, 21, between which a mold cavity 22 is formed. In the manufacture of a sun visor body 1, first the unit comprising the bearing bodies 6, rod 11 and reinforcing struts 12 (in this case referring to the exemplary embodiment of FIG. 3), as well as a length of material 9 are placed in the lower tool half 21. A second length of material 9 is delivered to the upper tool half 20 and fixed in it, for instance by means of adhesive dots 23. A metered quantity of a liquid, sticky two-component mixture is then placed in the mold cavity 22 of the lower tool half 21, after which the tool halves are closed and locked. The foam now reacts inside the mold cavity and presses the lengths of material 9 against the mold cavity walls, thereby establishing an intimate, inseparable communication between the foam material and the lengths of material 9.

Of course, it should be understood that changes and modifications can be made to the preferred embodiments described above. It is therefore intended that the foregoing detailed description be regarded as illustrative rather than limiting, and that it be understood that it is following claims, including all equivalents, which are intended to define the scope of this invention.

We claim:

1. A sun visor for vehicles, the sun visor comprising a sun visor body formed of foamed plastic, at least one bearing body embedded in the foamed plastic material of the sun visor body, and a stiffener for the sun visor body, wherein the stiffener comprises at least one length of paper material disposed on at least one broad side of the sun visor body extending along the length of the side and intimately joined to the plastic material of the sun visor body.

2. The sun visor of claim 1, wherein the length of paper material is pierced in at least one location by the foamed plastic material of the sun visor body.

3. The sun visor of claim 1, further comprising a second length of material disposed on a second broad side of the sun visor body.

4. The sun visor of claim 1, wherein the length of paper material has a surface area covering a substantial portion of the area of the broad side of the sun visor body.

5. The sun visor of claim 1, characterized in that the length of material comprises a paper blank.

6. The sun visor of claim 1, wherein the paper material has a weight per unit of surface area of between 50 $g/m^2$ and 110 $g/m^2$.

7. The sun visor of claim 6, wherein the paper material has a weight per unit of surface area of about 80 $g/m^2$.

8. The sun visor of claim 1, further comprising a sheath disposed over the sun visor body and the stiffener, wherein the material of the sheath is selected from one of the group consisting of a plastic film, textile material, and leather.

9. A method for producing a sun visor comprising providing a foaming mold defining a mold cavity for a sun visor body, positioning at least one bearing body for a sun visor axle into the mold cavity, positioning a length of material incapable of substantial stretching on at least one wall of the mold cavity, closing the foaming mold, and introducing a liquid plastic mixture into the mold cavity that foams up and hardens in the mold cavity.

10. The method of claim 9, further comprising applying adhesive to a side of the length of material and adhering the material to the mold cavity wall.

11. The method of claim 9, further comprising applying a vacuum to the foaming mold to retain at least one length of material on the mold cavity wall.

12. The method of claim 9, wherein the length of material comprises paper.

13. The method of claim 12, wherein the paper has a weight per unit of surface area between 50 $g/m^2$ and 110 $g/m^2$.

14. The method of claim 13, wherein the paper has a weight of about 180 $g/m^2$.

15. The method of claim 9, further comprising placing a sheath of material around the sun visor body after the hardening of the plastic material, wherein the material of the sheath is selected from one of the group consisting of a plastic film, textile material, and leather.

* * * * *

UNITED STATES PATENT AND TRADEMARK OFFICE
CERTIFICATE OF CORRECTION

PATENT NO : 6,019,415
DATED : February 1, 2000
INVENTOR(S): Lothar Viertel and Patrick Welter It is certified that error appears in the above-identified patent and that said Letters Patent are hereby corrected as shown below:

In the ABSTRACT, "STIFFENER" should read as --stiffening means--.

In Column 6, Line 24, Claim 14, "180" should read as --80--.

Signed and Sealed this

Third Day of April, 2001

Attest:

NICHOLAS P. GODICI

Attesting Officer     Acting Director of the United States Patent and Trademark Office